Patented Mar. 29, 1949

2,465,882

UNITED STATES PATENT OFFICE 2,465,882

HYDROCARBON-THIO-CYCLOHEXENONES

John David Kendall and Frank Peter Doyle, Ilford, England, assignors to Ilford Limited, Ilford, England, a British company No Drawing. Application July 1, 1946, Serial No. 680,822. In Great Britain July 3, 1945

17 Claims. (Cl. 260—586)

This invention relates to dyestuff intermediates which are of value in the production of cyanine sensitising dyes.

In U. S. Patent No. 2,372,960 and U. S. application Serial No. 461,323, filed October 8, 1942, and issued as Patent No. 2,438,704 on March 30, 1948, it is explained that if an open chain diketone of the formula $$R_4CO-CH_2-CO-R_5 \qquad (1)$$

(where $R_4$ and $R_5$ represent alkyl, aralkyl or aryl groups) is condensed with an alkyl or aralkyl quaternary salt of a heterocyclic nitrogen compound containing an alkyl thio group or an acetanilido vinyl group in the $\alpha$ or $\gamma$ position to the heterocyclic nitrogen atom, a compound is produced of the general type shown in the following formula

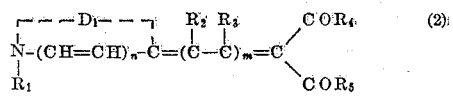
(2)

where $R_4$ and $R_5$ have the significance given above, $R_2$ and $R_3$ are hydrogen atoms or hydrocarbon groups, $R_1$ is an alkyl or aralkyl group, $D_1$ is the residue of a heterocyclic nitrogen compound, $n$ is nought or 1 and $m$ is a positive integer. In these specifications it is shown that compounds of the formula (2) may be converted to reactive dye intermediates by treating with an alkyl or aralkyl mercaptan ($R_6SH$) in the presence of a strong acid (HA). The products are of the following formula

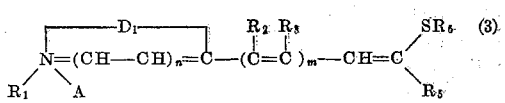
(3)

It is to be noted that this process of mercaptalisation results in the fission of the compound with the loss of the —$COR_4$ group. (Actually the —$COR_4$ and —$COR_5$ groups are equivalent and the question of which one is split off depends on the nature of the specific compounds used.)

We have found that, although the direct mercaptalisation of the original diketone of Formula 1 can be made to occur to produce di or tetra mercaptals, the products are very unreactive.

It has now been discovered, and this forms the basis of the present invention, that cyclic 1.3-diketones of the general formula

(4)

where $D_2$ is the residue of a cyclohexane 1.3-dione ring (of which the methylene groups constituting $D_2$ may be hydrocarbon-substituted), on treating with an alkyl, aryl or aralkyl mercaptan ($R_6SH$) in the presence of a strong acid (HA) are converted to mono thioethers of the type of

(5)

and that such mono thioethers are valuable intermediates in the production of new types of cyanine dyestuffs. It is to be noted that only a mono thioether is formed and that there is no fission of the ring with the loss of a carbonyl group, in contrast to what might have been expected.

According to the present invention, therefore, dyestuff intermediates are prepared by treating a cyclohexane 1.3-dione with a hydrocarbon-mercaptan in the presence of a strong acid.

The reaction is applicable quite generally to cyclohexane 1.3-diones of the general Formula 4. Several compounds of this type are referred to in the specific examples hereinafter set forth and others are:

| | |
|---|---|
| 5-isopropyl-cyclohexane dione (1:3) | (Beilstein's Handbuch der Organische Chemie, 4th edition, volume VII, page 564) |
| 4:5:5-trimethyl-cyclohexanedione (1:3) | Ibid., page 565 |
| 4-phenyl-5:5-dimethyl-cyclohexane dione (1:3) | Ibid., page 708 |
| 5-styryl-cyclohexane dione (1:3) | Ibid., page 735 |

The group $R_6$ is preferably a lower alkyl group, e. g. ethyl, since the lower alkyl mercaptans are more easily reactive in the process of this invention and are more simple to handle. From the point of view of the production of cyanine dyestuffs from the intermediates of Formula 5, the nature of the group $R_6$ is not of particular importance since, as shown in co-pending United States applications Serial Numbers 680,824; 680,-825; and 680,826, all filed on July 1, 1946, the $SR_6$ grouping is eliminated in the reaction which produces the cyanine dyestuffs.

In carrying out the reaction one molecular equivalent of the cyclic ketone is treated with preferably not less than two molecular equivalents of mercaptan; a considerable excess of mercaptan may be present and function as a solvent. The quantity of the strong acid is not critical, but generally at least one molecular equivalent of a dibasic acid or at least two molecular equivalents of a monobasic acid may be employed.

The most convenient acid to employ is dry hydrochloric acid. However, other strong acids may be employed, e. g. other hydrohalic acids, nitric acid, sulphuric acid, phosphoric acid, or strong organic acids, e. g. p-toluene sulphonic acid. The term "strong acid" is to be understood as meaning an acid which is at least as strong as p-toluene sulphonic acid.

It is preferred to keep the reaction mixture as dry as possible. A solvent for the reactants may be present, e. g. benzene, toluene or a lower alcohol, or an ether, for example, diethyl ether. The reaction proceeds at normal room temperature and there is no necessity to heat the reaction mixture.

The following examples illustrate the invention:

EXAMPLE 1

Preparation of $\Delta^{2:3}$-(3-ethylthio-5:5-dimethyl) cyclohexenone (1)

3 parts by weight of 5:5-dimethyl-cyclohexane dione (1:3) and 12.6 parts by weight of ethyl mercaptan were mixed and cooled in an ice-salt mixture. Anhydrous hydrochloric acid gas was then passed into the suspension for 30 minutes and it was then allowed to stand for 36 hours during which time the dione was slowly replaced by a yellow oil. (After 18 hours more hydrochloric acid gas was passed in to ensure completion of the reaction.) The mixture was poured into dilute sodium carbonate solution, the oil extracted with ether and the extracts, after washing with 10% sodium carbonate solution and water, were dried over potassium carbonate and the ether removed by distillation. The residue, a clear yellow liquid, when distilled in vacuo yielded the desired product as an almost colourless distillate, boiling point 167–169° C. at 25 mms. pressure. It had the formula

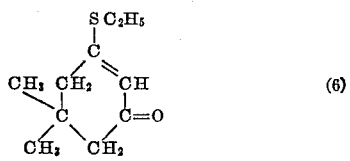
(6)

EXAMPLE 2

Preparation of $\Delta^{2:3}$-(3-ethylthio-5-phenyl) cyclohexenone (1)

5.7 parts by weight of 5-phenyl cyclohexane dione (1:3) and 16.8 parts by weight of ethyl mercaptan were reacted in exactly the same way as in Example 1. The product (undistilled) was a thick yellow oil and had the formula

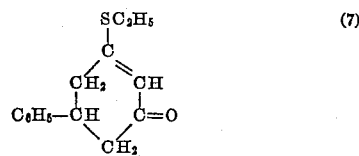
(7)

EXAMPLE 3

Preparation of $\Delta^{2:3}$-(3-ethylthio-5-methyl) cyclohexenone (1)

10 parts by weight of 5-methyl-cyclohexane dione (1:3) and 16.8 parts by weight of ethyl mercaptan were reacted as in Example 1 and the product obtained as a mobile, light yellow oil, boiling point 147–148° at a 20 mms. pressure. It had the formula

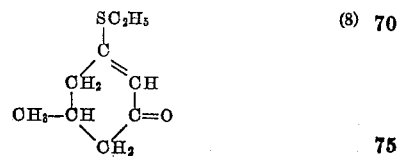
(8)

EXAMPLE 4

Preparation of $\Delta^{2:3}$-(3-ethylthio) cyclohexenone (1)

6.5 parts by weight of cyclohexane dione (1:3) and 12.5 parts by weight of ethyl mercaptan were reacted as in Example 1. The product was obtained as a yellow oil, boiling point 160–165° C. at 20 mms. pressure. The oil darkened to a deep orange colour on standing. It had the formula

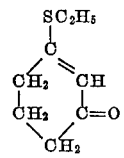
(9)

EXAMPLE 5

Preparation of the compound of Example 1 using various solvents and reactants (a) 5 parts by weight of 5:5-dimethyl-cyclohexane dione (1:3) and 12.5 parts by weight of ethyl mercaptan were mixed and 2 parts by weight of concentrated sulphuric acid was added slowly. The mixture after standing 5 days in a sealed flask was poured into excess dilute sodium carbonate solution and the product isolated as in Example 1 to yield a light yellow oil, boiling point 168–170° C. at 27 mms. pressure.

(b) 5 parts by weight of 5:5-dimethyl-cyclohexane dione (1:3), 10 parts by weight of ethyl mercaptan, 13 parts by weight of benzene, and 5 parts by weight of calcium sulphate (anhydrous) were mixed and dry hydrochloric acid gas passed in until the solution was saturated. After standing for 3 days the product was isolated as in Example 1 to yield a light yellow oil, boiling point 167–171° C. at 27 mms. pressure.

(c) 5 parts by weight of 5:5-dimethyl-cyclohexane dione (1:3), 10 parts by weight of ethyl mercaptan, 12 parts by weight of ethyl alcohol and 5 parts by weight of calcium sulphate (anhydrous) were mixed and dry hydrochloric acid gas passed in until the solution was saturated. After standing for 2 days the product was isolated as in Example 1 to yield a light yellow oil, boiling point 169–172° at 28 mms. pressure.

(d) 5 parts by weight of 5:5-dimethyl-cyclohexane dione (1:3), 12.5 parts by weight of ethyl mercaptan, 12 parts by weight of toluene-p-sulphonic acid and 12 parts by weight of ethyl alcohol were mixed and allowed to stand for 5 days in a sealed flask. The product was isolated as in Example 1, boiling point 172–173° C. at 32 mms. pressure.

What we claim is:

1. Process for the production of a dyestuff intermediate which comprises treating a cyclohexane 1:3-dione with a mercaptan taken from the group consisting of alkyl, aryl and aralkyl mercaptans in the presence of a strong acid.

2. Process for the production of a dyestuff intermediate which comprises treating a cyclohexane 1:3-dione with a lower alkyl mercaptan in the presence of a strong acid.

3. Process for the production of a dyestuff intermediate which comprises treating a cyclohexane 1:3-dione with mercaptan taken from the group consisting of alkyl, aryl and aralkyl mercaptans in the presence of a strong acid and a solvent for the reactants.

4. Process for the production of a dyestuff intermediate which comprises treating a cyclohexane 1:3-dione with a mercaptan taken from the group consisting of alkyl, aryl and aralkyl mercaptans in the presence of a strong acid, the reaction mixture being kept dry.

5. Process for the production of a dyestuff intermediate which comprises treating a cyclohexane 1:3-dione with a lower alkyl mercaptan in the presence of a strong acid and a solvent for the reactants, the reaction mixture being kept dry.

6. Process for the production of a dyestuff intermediate which comprises treating a cyclohexane 1:3-dione with a lower alkyl mercaptan in the presence of a strong acid and a solvent for the reactants, the reaction mixture being kept dry and allowed to stand for a substantial period at room temperature.

7. Process for the production of a dyestuff intermediate which comprises treating a cyclohexane-1:3-dione with ethyl mercaptan in the presence of a strong acid and a solvent for the reactants, the reaction mixture being kept dry and allowed to stand for a substantial period at room temperature.

8. A $\Delta^{2:3}$-(3-ethyl thio)cyclohexenone (1).

9. A $\Delta^{2:3}$-(3-ethyl thio-5-phenyl)cyclohexenone (1).

10. Process for the production of a dyestuff intermediate which comprises treating a cyclohexane 1:3-dione with a lower alkyl mercaptan in the presence of dry hydrochloric acid and a solvent for the reactants, the reaction mixture being kept dry and allowed to stand for a substantial period at room temperature.

11. Process for the production of a dyestuff intermediate which comprises treating a 5-hydrocarbon-substituted cyclohexane 1:3-dione with a hydrocarbon mercaptan taken from the group consisting of alkyl, aryl and aralkyl mercaptans in the presence of a strong acid.

12. Process for the production of a dyestuff intermediate which comprises treating a 5-hydrocarbon-substituted cyclohexane 1:3-dione with a lower alkyl mercaptan in the presence of a strong acid.

13. Process for the production of a dyestuff intermediate which comprises treating a 5-hydrocarbon-substituted cyclohexane 1:3-dione with a lower alkyl mercaptan in the presence of a strong acid and a solvent for the reactants, the reaction mixture being kept dry and allowed to stand for a substantial period at room temperature.

14. A $\Delta^{2:3}$-(3-hydrocarbon thio) cyclohexenone (1) wherein the 3-hydrocarbon radical is taken from the group consisting of alkyl, aryl and aralkyl groups.

15. A $\Delta^{2:3}$-(3-alkyl thio) cyclohexenone (1).

16. A $\Delta^{2:3}$-(3-hydrocarbon thio-5-hydrocarbon-substituted) cyclohexenone (1) wherein the 3-hydrocarbon radical is taken from the group consisting of alkyl, aryl and aralkyl groups.

17. A $\Delta^{2:3}$-(3-alkyl thio-5-hydrocarbon-substituted) cyclohexenone (1).

JOHN DAVID KENDALL.
FRANK PETER DOYLE.

REFERENCES CITED

The following references are of record in the file of this patent:

Recsei, Berichte, vol. 60B, pages 1836–40 (1927).